United States Patent
Chung

(10) Patent No.: US 7,422,155 B2
(45) Date of Patent: Sep. 9, 2008

(54) IMAGE PRINTING METHOD AND APPARATUS WHICH CAN DETECT EDGE OF PRINTING MEDIUM WHILE READING BARCODE ON PRINTING MEDIUM USING ONE SENSOR

(75) Inventor: Jin-Tae Chung, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 11/288,401

(22) Filed: Nov. 29, 2005

(65) Prior Publication Data

US 2006/0113388 A1    Jun. 1, 2006

(30) Foreign Application Priority Data

Nov. 29, 2004    (KR) .......................... 2004-0098691

(51) Int. Cl.
*G11B 5/09*    (2006.01)
(52) U.S. Cl. ............. 235/462.18; 235/432; 235/462.01; 235/462.19; 235/462.08
(58) Field of Classification Search ................. 235/432, 235/462.01, 462.18
See application file for complete search history.

(56) References Cited

U.S. PATENT DOCUMENTS

| | | | |
|---|---|---|---|
| 4,606,660 A | | 8/1986 | Bradshaw et al. |
| 4,757,189 A | | 7/1988 | Daboub |
| 4,859,840 A | * | 8/1989 | Hasegawa et al. ...... 235/462.18 |
| 5,150,977 A | | 9/1992 | Yoshikawa |
| 5,262,637 A | | 11/1993 | Cumberledge et al. |
| 5,442,164 A | * | 8/1995 | Adachi .................. 235/462.18 |

FOREIGN PATENT DOCUMENTS

| | | |
|---|---|---|
| CN | 1039457 C | 8/1998 |
| EP | 0 668 568 A2 | 8/1995 |
| EP | 0 668 568 A3 | 9/1998 |
| EP | 1 136 283 A2 | 9/2001 |
| EP | 1 136 283 A3 | 11/2002 |
| JP | 01-308677 | 12/1989 |
| JP | 04-039074 | 2/1992 |
| JP | 04-078843 | 3/1992 |
| JP | 04-093932 | 3/1992 |
| WO | WO 2004/024458 A2 | 3/2004 |
| WO | WO 2004/024458 A3 | 3/2004 |

* cited by examiner

*Primary Examiner*—Michael G. Lee
*Assistant Examiner*—Kristy A Haupt
(74) *Attorney, Agent, or Firm*—Roylance, Abrams, Berdo & Goodman, L.L.P.

(57) ABSTRACT

An image printing method and apparatus which can detect the edge of a printing medium on which a barcode is written while reading the barcode using one sensor unit. The apparatus for printing an image on a printing medium on which a barcode is written includes a sensor unit sensing the barcode and generating a sensing signal. A first counting unit counts the sensing signal to generate a first count value when the value of the sensing signal is changed from a high value to a low value. A second counting unit counts the sensing signal of the barcode simultaneously with the first counting unit to generate a second count value which is initialized whenever the value of the sensing signal is changed. A detecting unit detects the edge of the printing medium based on the first and second count values of the first counting unit and the second counting unit. A reading unit reads the barcode based on the second count value of the second counting unit.

18 Claims, 7 Drawing Sheets

(a)

(b)

(c)

(a)

(b)

(c)

IMAGE PRINTING METHOD AND APPARATUS WHICH CAN DETECT EDGE OF PRINTING MEDIUM WHILE READING BARCODE ON PRINTING MEDIUM USING ONE SENSOR

CROSS-REFERENCE TO RELATED PATENT APPLICATION

This application claims the benefit under 35 U.S.C. §119 (a) of Korean Patent Application No. 10-2004-0098691, filed on Nov. 29, 2004, in the Korean Intellectual Property Office, the entire disclosure of which is hereby incorporated by reference.

BACKGROUND OF THE INVENTION

1. Field of the Invention

The present invention relates to an image printing method and apparatus. More particularly, the present invention relates to an image printing method and apparatus which can detect the edge of a printing medium on which a barcode is written while reading the barcode using one sensor unit.

2. Description of the Related Art

FIG. 1 is a partial functional block diagram of a conventional image printing apparatus for detecting the edge of a printing medium. The printing medium 10 is conveyed to a sensor unit 120 using a conveying belt 150 connected to a conveying roller 110. The edge of the printing medium 10 is detected by the sensor unit 120, and the printing medium 10 is conveyed from the detected edge location by a predetermined length until the edge of the printing medium 10 reaches a feed roller 130. Then, an image is printed on the printing medium 10 while the printing medium 10 is being conveyed from the feed roller 130 to a printing head unit 140 according to an image printing command of a user.

Recently, various kinds of printing media have been developed. A user selects a printing medium to print an image, according to the kind of image, the kind of printer, and the user's taste. In order to provide information on the printing medium, a barcode is written on the printing medium 10. Accordingly, a sensor unit is required for reading the barcode. If the image printing unit uses a plurality of sensor units to detect the edge of the printing medium 10 and read the barcode, the cost for manufacturing the image printing apparatus increases. Also, since the edge of the printing medium 10 is detected and the barcode is read using each sensor unit, it printing takes too long.

SUMMARY OF THE INVENTION

Embodiments of the present invention provide an image printing apparatus which can detect the edge of a printing medium while reading a barcode on the printing medium using one sensor unit.

Embodiments of the present invention also provide an image printing method which can detect the edge of a printing medium while reading a barcode on the printing medium using one sensor unit.

According to an aspect of the present invention, an apparatus for printing an image on a printing medium on which a barcode is written, includes a sensor unit for sensing the barcode and generating a sensing signal. A first counting unit counts the sensing signal to generate a first count value when the value of the sensing signal is changed from a high value to a low value. A second counting unit counts the sensing signal of the barcode simultaneously with the first counting unit to generate a second count value which is initialized whenever the value of the sensing signal is changed. A detecting unit detects the edge of the printing medium based on the first and second count values of the first counting unit and the second counting unit. A reading unit reads the barcode based on the second count value of the second counting unit.

The detecting unit preferably includes a comparing unit for comparing a conveyance distance of the printing medium calculated based on the first count value of the first counting unit with the total length of the barcode. A changing unit preferably changes an information flag value if the conveyance distance of the printing medium calculated based on the first count value of the first counting unit becomes greater than the total length of the barcode. An edge detecting unit preferably detects the edge of the printing medium based on the low value of the sensing signal generated after the information flag value is changed.

According to another aspect of the present invention, a method for printing an image on a printing medium on which a barcode is written, includes sensing the barcode and generating a sensing signal (operation (a)). The sensing signal is counted to generate a first count value when the value of the sensing signal is changed from a high value to a low value (operation (b)). The sensing signal is counted simultaneously with operation (b) to generate a second count value which is initialized whenever the value of the sensing value is changed (operation (c)). The barcode is read based on the second count value (operation (d)). The edge of the printing medium is detected based on the first count value and the second count value (operation (e)).

Operation (e) preferably includes comparing a conveyance distance of the printing medium calculated based on the first count value with the total length of the barcode. An information flag value is preferably changed if the conveyance distance of the printing medium calculated based on the first count value is greater than the total length of the barcode. The edge of the printing medium is preferably detected based on the low value of the sensing signal generated after the information flag value is changed.

BRIEF DESCRIPTION OF THE DRAWINGS

The above and other features and advantages of exemplary embodiments of the present invention will become more apparent from the following detailed description read in conjunction with the attached drawings in which.

Throughout the drawings, like reference numbers should be understood to refer to like elements, features and structures.

DETAILED DESCRIPTION OF EXEMPLARY EMBODIMENTS

An image printing apparatus and method according to exemplary embodiments of the present invention will now be described more fully with reference to the accompanying drawings.

Figure 1:
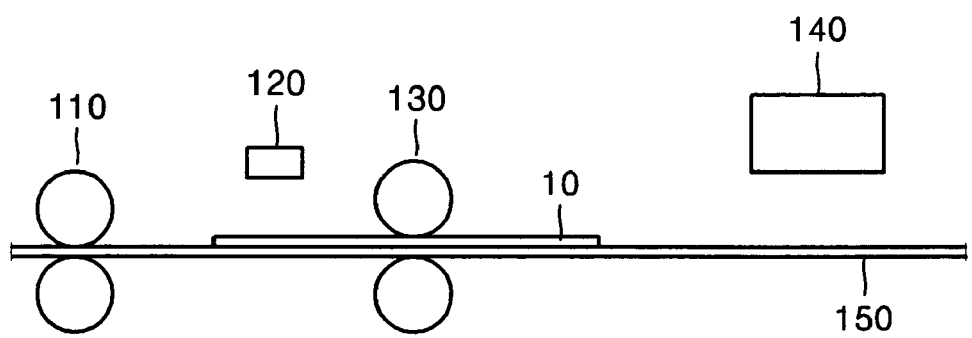
FIG. 1 is a partial functional block diagram of a conventional image printing apparatus for detecting the edge of a printing medium.
Figure 2:
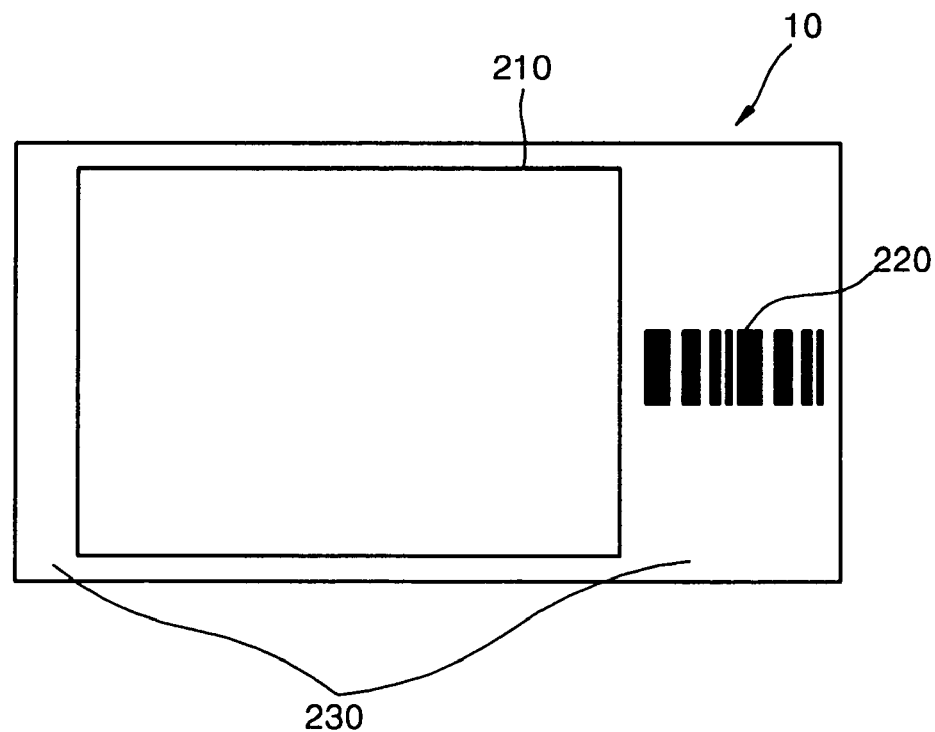
FIG. 2 shows a printing medium on which a barcode is written according to an embodiment of the present invention.

FIG. 2 shows a printing medium on which a barcode is written according to an embodiment of the present invention. The printing medium 10 includes a printing area 210 on which an image will be printed and an external area 230 that includes the barcode 220. The barcode 220 preferably stores information about the printing medium 10. The image is printed on the printing area 210, and, since the printing area 210 and the external area 230 are separated from each other, only the printing area 210 is substantially used. Preferably, the printing medium 10 is a printing medium which exhibits colors such as yellow, magenta, and cyan when heat is applied to it.

Figure 3:
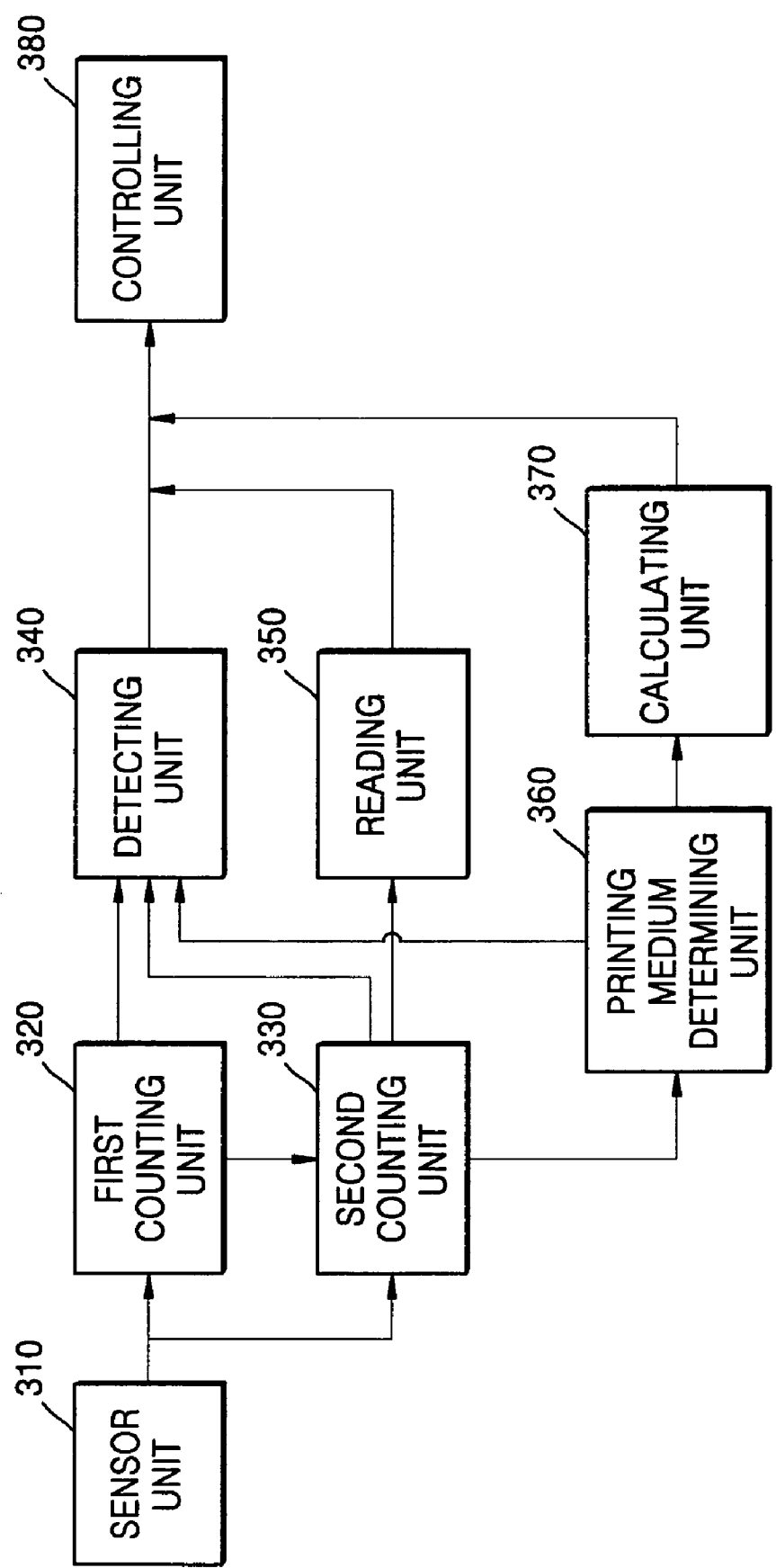
FIG. 3 is a functional block diagram of an image printing apparatus according to an embodiment of the present invention.

FIG. 3 is a functional block diagram of an image printing apparatus according to an embodiment of the present invention. The image printing apparatus according to an exemplary embodiment of the present invention includes a sensor unit 310, a first counting unit 320, a second counting unit 330, a detecting unit 340, a reading unit 350, a printing medium determining unit 360, a calculating unit 370, and a controlling unit 380.

The sensor unit 310 includes a light emitting unit (not shown) and a light receiving unit (not shown). The light emitting unit emits light such as white light to the printing medium 10. The printing medium 10 is conveyed by a predetermined amount, for example, 1/4800 inch. The light receiving unit receives the light reflected from the printing medium and generates a sensing signal corresponding to the intensity of the reflected light. Preferably, the sensing signal is amplified by an amplifying unit (not shown) to be provided to the first counting unit 320 or the second counting unit 330.

The first counting unit 320 counts the sensing signal in a predetermined interval when the value of the sensing signal is changed from a high value to a low value. The sensing signal has a low value (0) and a high value (1) according to the intensity of the reflected light based on a predetermined threshold value. While the printing medium 10 is conveyed in the predetermined interval, the intensity of the light reflected from the printing area 210 is preferably greater than the threshold value. The intensity of the light reflected from a bar of the barcode on the printing medium 10 or the conveying belt 150 is preferably less than the threshold value. Accordingly, the first counting unit 320 counts the sensing signal in the predetermined interval when the barcode of the printing medium 10 or the conveyance belt 150 is detected by the sensor unit 310.

The first counting unit 320 counts the sensing signal during the total length of the barcode, regardless of the change of the sensing signal value. The total length of the barcode may be determined according to the particular embodiment of the present invention and this is intended to be within the scope of the present invention. The first counting unit 320 counts the sensing signal of the printing medium 10 conveyed in the predetermined interval and thus the total length of the barcode can be calculated according to the count value of the first counting unit 320.

The second counting unit 330 performs the count simultaneously with the first counting unit 320 and counts the sensing signal of the barcode in a predetermined interval. The second count value is initialized whenever the value of the sensing signal is changed. The second counting unit 330 counts the sensing signal according to a count signal supplied from the first counting unit 320. The second counting unit 330 is initialized whenever the value of the sensing signal is changed, that is, whenever a low value is changed to a high value or a high value is changed to a low value. The barcode written on the printing medium 10 is read according to the value of the sensing signal counted by the second counting unit 330.

The detecting unit 340 detects the edge of the printing media 10 based on the low value of the sensing signal generated after the count value of the first counting unit 320 becomes greater than the total length of the barcode. The detecting unit 340 calculates the conveyance distance of the printing medium based on the count value of the sensing signal counted in the first counting unit 320. The edge of the printing medium 10 is detected based on the low value of the sensing signal generated after the conveyance distance of the printing medium 10 becomes greater than the total length of the barcode. That is, when the high value of the sensing signal of the external area 230 in the printing medium 10 is changed to the low value of the sensing signal of the conveying belt 150, the edge of the printing image 10 is detected.

The reading unit 350 reads the barcode based on the count value of the second counting unit 330. The reading unit 350 calculates the width of bars or spaces of the barcode based on the sensing signal counted by the second counting unit 330. The barcode is read based on the width of the spaces and bars, and the information on the printing medium 10 is obtained based on the read barcode.

Certain printing media may not include a barcode, and therefore an image printing apparatus and method according to an exemplary embodiment of the present invention can detect whether the printing medium being detected includes a barcode or not. The printing media determining unit 360 according to an exemplary embodiment of the invention determines that the printing medium does not have a barcode if the count value of the sensing signal counted by the second counting unit 330 exceeds the maximum width of a bar of the barcode. Barcodes written on the printing medium are composed of spaces and bars having predetermined widths. If the count value of the sensing signal counted by the second counting unit 330 is greater than the maximum width of the bars, the printing medium determining unit 360 determines that the printing medium does not include a barcode. If it is determined that the barcode is not written on the printing medium by the printing medium determining unit 360, the detecting unit 340 detects the edge of the printing medium, based on the counting time of the second counting unit 330.

The calculating unit 370 calculates the feed length of the printing medium, depending on whether or not a barcode exists on the printing medium 10. A feed length for positioning the edge of the printing medium at a feed roller (not shown) is calculated accordingly, and the calculating unit 370 calculates the feed length such that the edge of the printing medium is positioned at the conveyance roller. If a barcode is written on the printing medium 10, the feed length is calculated according to the distance between the sensor 310 and the feed roller for feeding the printing medium 10. If a barcode is not written on the printing medium 10, the feed length is calculated according to the value obtained by subtracting the maximum width of the bar from the distance between the sensor unit 310 and the feed roller for feeding the printing medium 10.

The controlling unit 380 controls the mode for printing the image on the printing medium 10 based on the detected edge of the printing medium 10, the information on the printing medium 10 obtained from the read barcode, and the feed length. A printing engine unit (not shown) prints the image on the printing medium under the control of the controlling unit 380.

Figure 4:
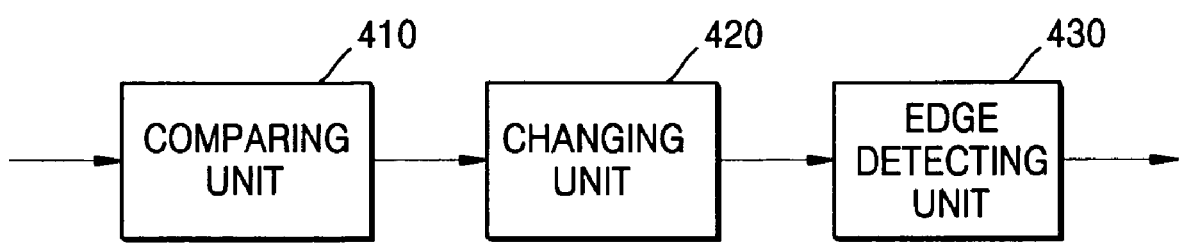
FIG. 4 is a functional block diagram of a detecting unit according to an embodiment of the present invention.

FIG. 4 is a functional block diagram of a detecting unit according to an embodiment of the present invention. The detecting unit 340 includes a comparing unit 410, a changing unit 420, and an edge detecting unit 430. The comparing unit 410 compares the conveyance distance of the printing medium calculated based on the count value of the first counting unit 320 with the total length of the barcode. The comparing unit 410 calculates the conveyance distance of the printing medium 10 based on the count value of the first counting unit 320 and compares the conveyance distance of the printing medium with the total length of the barcode. The changing unit 420 changes an information flag value if the conveyance distance of the printing medium 10 is greater than the total length of the barcode. The edge detecting unit 430 detects the edge of the printing medium 10 based on the low value of the sensing value generated after the information flag value is changed.

Figure 5:
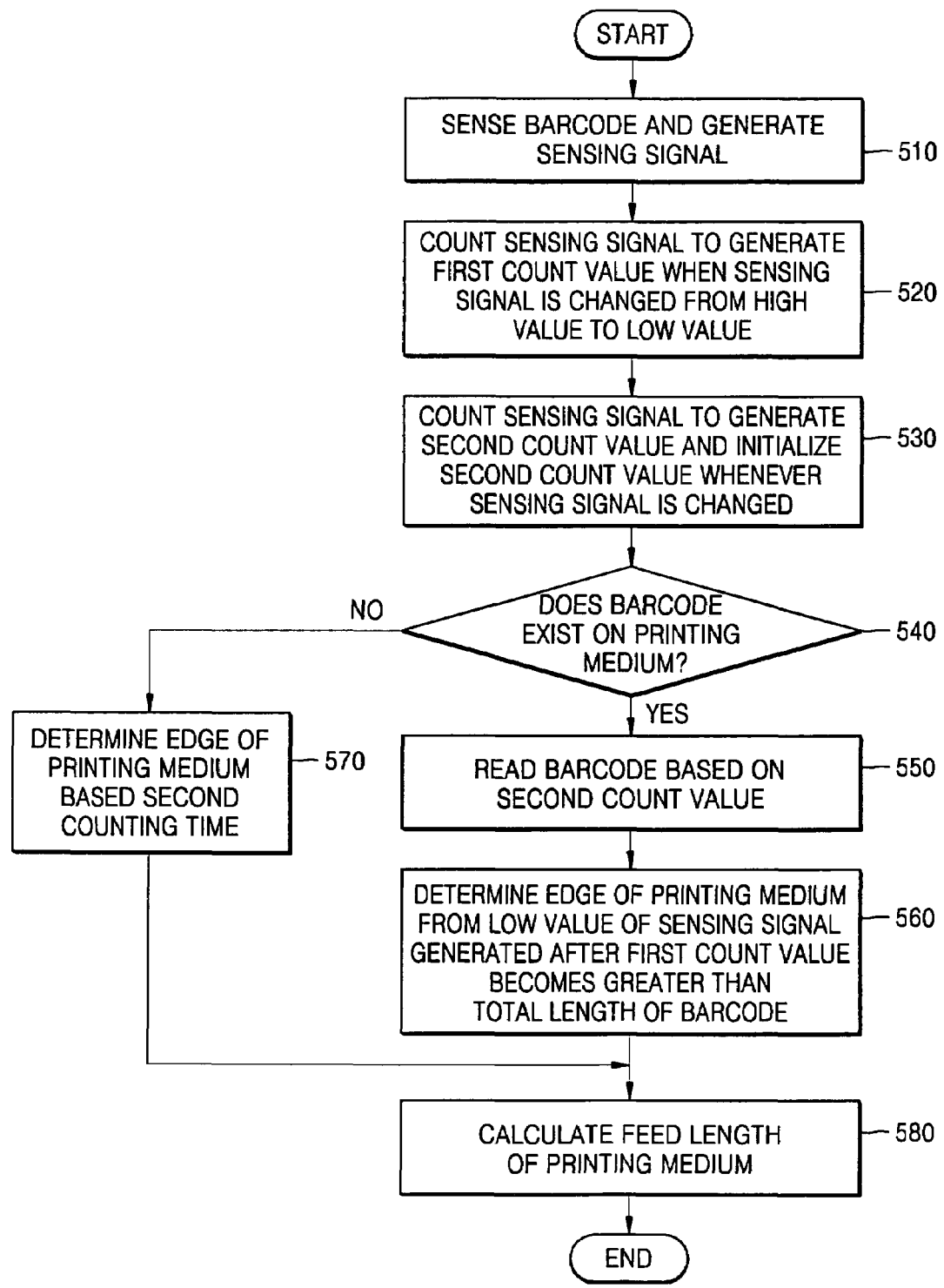
FIG. 5 is a flowchart of an image printing method according to an embodiment of the present invention.

FIG. 5 is a flowchart of an image printing method according to an embodiment of the present invention. The barcode written on the printing medium is sensed by the sensor unit to generate the sensing signal (operation 510). The light receiving unit of the sensor unit receives the light reflected from the printing medium and generates a sensing signal having a high value (1) or a low value (0) according to the predetermined threshold value. When the value of the sensing signal is changed from the high value to the low value, a first counting operation of the sensing signal is performed in a predetermined interval to generate a first count value (operation 520). Here, the sensing signal is counted during the total length of the barcode, regardless of the change of the sensing signal value.

A second counting operation of the sensing signal is performed to generate a second count value, simultaneously with the first counting operation, and the second count value is initialized the sensing signal whenever the sensing signal is changed and is continuously counted (operation 530). The width of the bar or the space of the barcode is calculated based on the value of the sensing signal counted by the second counting operation.

Based on the second count value, it is determined whether the barcode is written on the printing medium (operation 540). If the conveyance distance of the printing medium calculated based on the second count value of the sensing signal is greater than the maximum width of the bar of the barcode, the printing medium is determined to be a printing medium on which a barcode is not written. If the sensing signal is changed by the length less than the maximum width of the bar, the printing medium is determined to be a printing medium on which a barcode is written.

If it is determined that the barcode is written on the printing medium in operation 540, the barcode is read based on the second count value (operation 550). The edge of the printing medium is detected from the low value of the sensing signal generated after the conveyance distance of the printing medium calculated based on the first count value becomes greater than the total length of the barcode (operation 560). If it is determined that the barcode is not written on the printing medium in operation 540, the edge of the printing medium is detected based on the time when the second count operation starts (operation 570). The time when the second count starts corresponds to the boundary of the printing medium and the conveyance roller and the boundary is detected by the edge of the printing medium.

The feed length of the printing media is calculated based on the edge of the printing medium detected in the operation 560 or 570 (operation 580). In case that the barcode is written on the printing medium, the distance between the sensor unit for sensing the barcode and the feed roller for feeding the printing medium is calculated as the feed length. On the other hand, in case that the barcode is not written on the printing medium, the value obtained by subtracting the maximum width of the bar from the distance between the sensor unit for sensing the barcode and the feed roller for feeding the printing medium is calculated as the feed distance.

Figure 6:
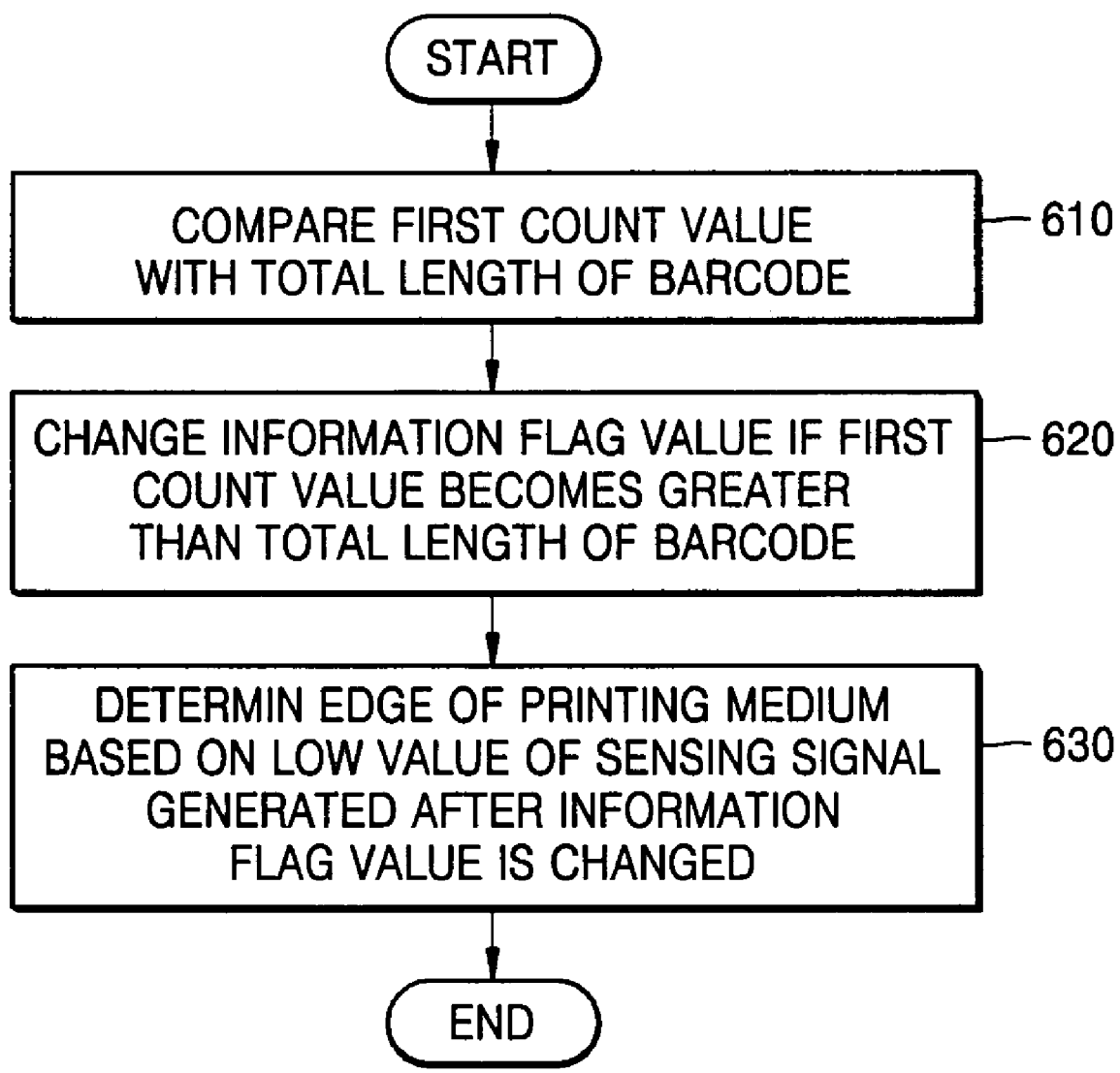
FIG. 6 is a flowchart of an operation of determining the edge of the printing medium according to an embodiment of the present invention.

FIG. 6 is a flowchart of an operation of determining the edge of the printing medium according to an embodiment of the present invention. The conveyance distance of the printing medium calculated from the count value of the first counting unit is compared with the total length of the barcode (operation 610). If the conveyance distance of the printing medium is greater than the total length of the barcode, the information flag value is changed (operation 620). Based on the low value of the sensing signal generated after the information flag value is changed, the time when the low value of the sensing signal is generated indicates the edge of the printing medium (operation 630).

Figure 7:
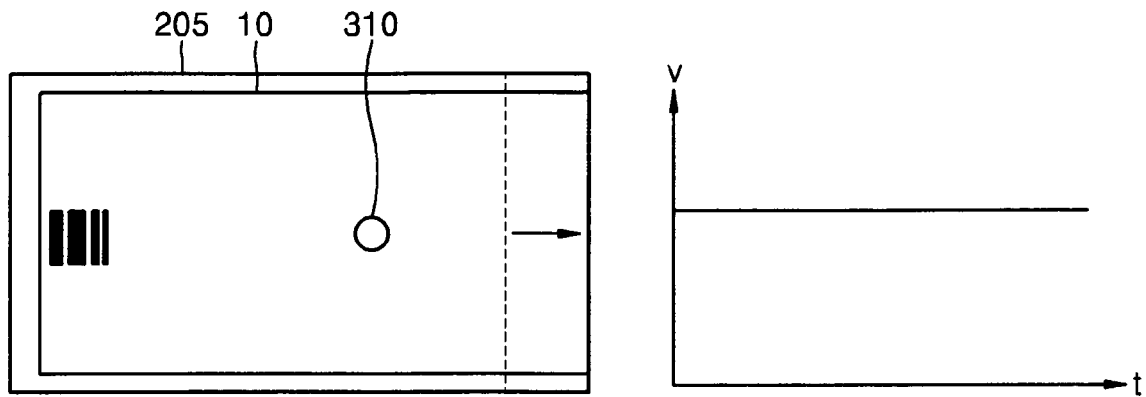
FIG. 7 shows a sensing signal according to the conveyance of the printing medium on which the barcode is written according to an embodiment of the present invention.
Figure 7:
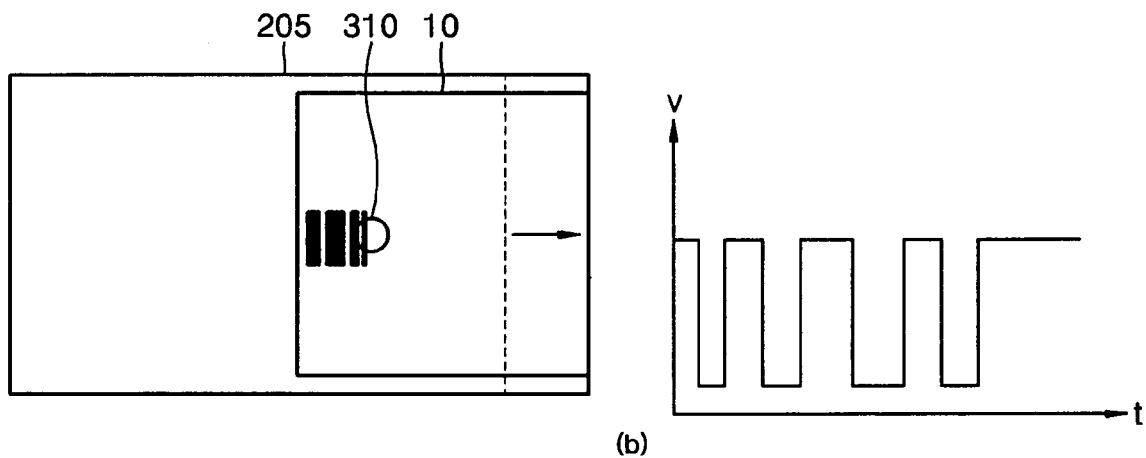
Figure 7:
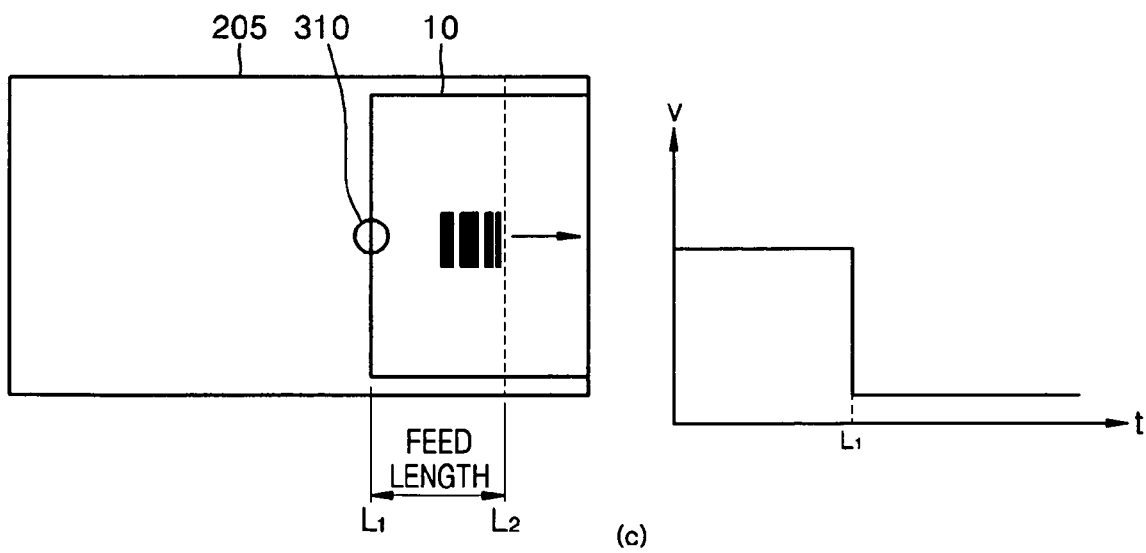

FIG. 7 shows the sensing signal according to the conveyance of the printing medium on which the barcode is written. FIG. 7(A) shows a period of time that the printing area 210 of the printing medium 10 passes through the sensor unit 310 and the sensing signal generated by the sensor unit 310 therein. The sensing signal of the printing area 210 generated in the sensor unit 310 has the high value.

FIG. 7(B) shows a period of time when the barcode area 220 of the printing medium 10 passes through the sensor unit 310 and the sensing signal generated by the sensor unit 310 therein. The sensing signal of the barcode area 220 generated in the sensor unit 310 has the high value or the low value, depending on the bar and the space of the barcode. When the low value of the sensing signal is first generated by the sensor unit 310, the first counting unit 320 begins to the count and the second counting unit simultaneously begins to the count. The second counting unit 330 counts the sensing signal, and is initialized whenever the sensing signal is changed and then counts the sensing signal of the bar or the space of the barcode.

FIG. 7(C) shows a period of time after the barcode area 220 of the printing medium 10 passes through the sensor unit 310 and the sensing signal generated by the sensor unit 310 therein. After the sensor unit 310 passes through the barcode area 220, that is, the first counting unit 320 counts the total barcode length, the information flag value is changed. After the information flag value is changed, the time ($L_1$) that the low value of the sensing signal is generated by the sensor unit 310 is detected to detect the edge of the printing medium 10. The printing medium determining unit 360 determines whether the barcode is written on the printing medium 10 based on the change of the sensing signal of the barcode counted by the second counting unit 330. Based on the determination of the printing medium determining unit 360, the calculating unit 370 calculates the distance between the sensor unit and the feed roller for feeding the printing medium 10 as the feed length of the printing medium.

Figure 8:
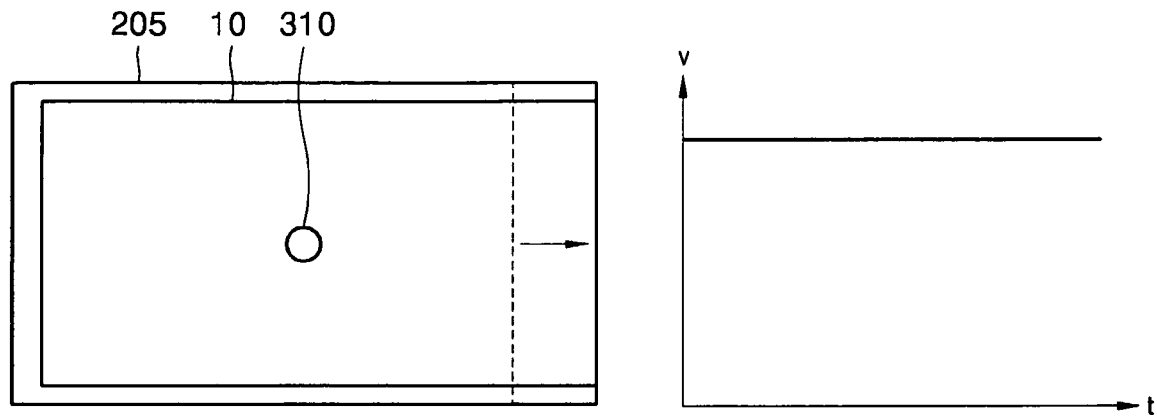
FIG. 8 shows a sensing signal according to the conveyance of the printing medium on which the barcode is not written according to an embodiment of the present invention.
Figure 8:
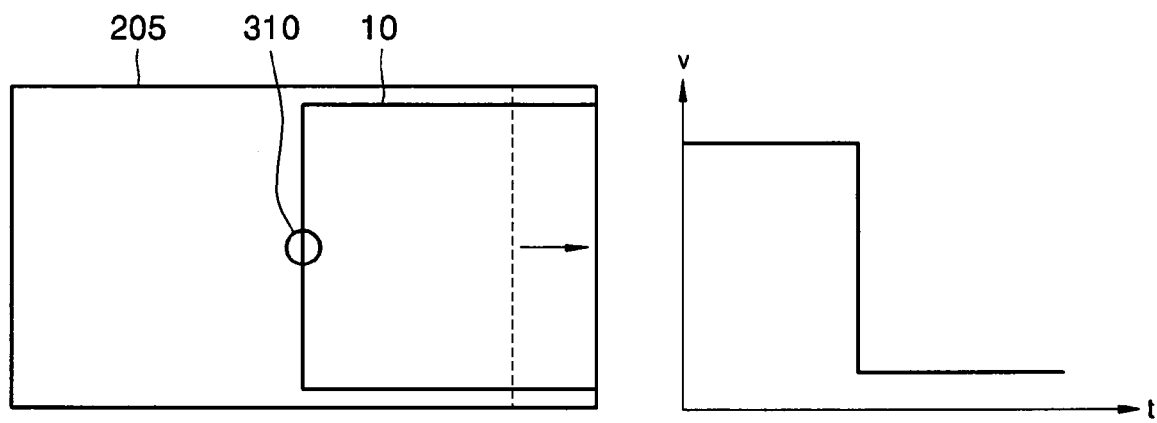
Figure 8:
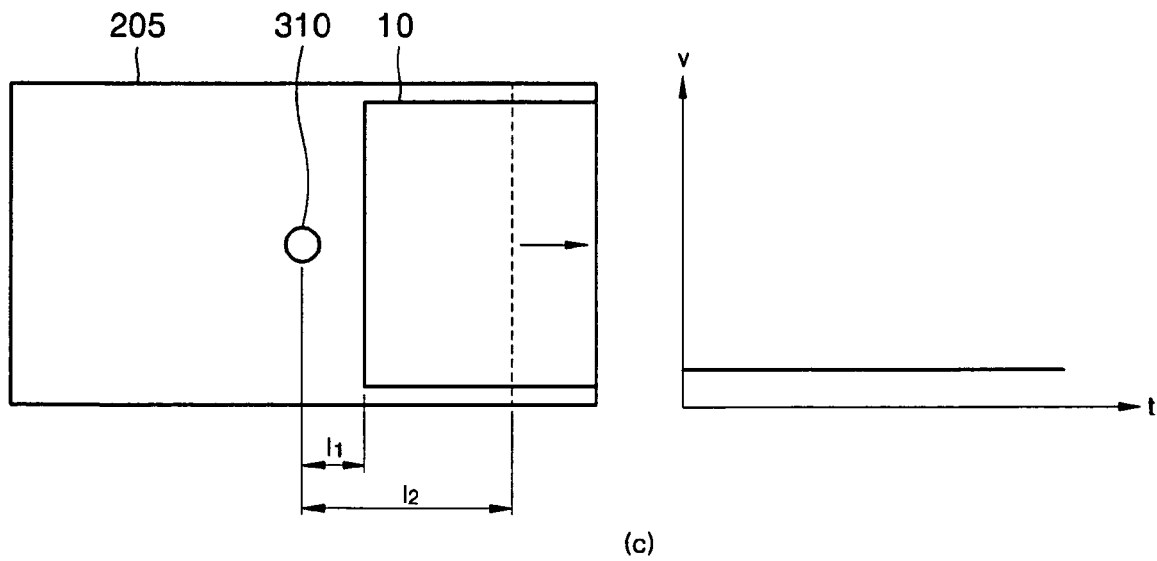

FIG. 8 shows the sensing signal according to the conveyance of the printing medium on which the barcode is not written. FIG. 8(A) shows a period of time when the printing area 210 of the printing medium 10 passes through the sensor unit 310 and the sensing signal generated by the sensor unit 310 therein. The sensing signal of the printing area 210 generated in the sensor unit 310 has the high value.

FIG. 8(B) shows a period of time when the printing medium 10 passes through the sensor unit 310 and the sensing signal generated by the sensor unit 310 therein. The sensing signal generated in the sensor unit 310 is changed from the high value to the low value when the printing medium passes through the sensor unit 310. The first counting unit 320 begins to the count when the sensing signal is changed from the high value to the low value and the second counting unit 330 begins to the count simultaneously with the first counting unit 320.

FIG. 8(C) shows a period of time after the printing medium 10 passes through the sensor unit 310 and the sensing signal generated by the sensor unit 310 therein. The second counting unit performs the count when the edge of the printing medium 220 passes through the sensor unit 310, and, if the count value is greater than the maximum width ($l_1$) of the bar or the space of the barcode, the detecting unit 340 detects the time when the value of the sensing signal is changed from the high value to the low value as the edge of the printing medium. The printing medium determining unit 360 determines whether the barcode is written on the printing medium 10 based on the change of the sensing signal of the barcode counted by the second counting unit 330. Based on the determination of the printing medium determining unit 360, the calculating unit 370 calculates the value obtained by subtracting the maximum width ($l_1$) of the bar from the distance ($l_2$) between the sensor unit and the feed roller for feeding the printing medium 10 as the feed length of the printing medium.

Exemplary embodiments of the present invention can be written as computer programs and can be implemented in general-use digital computers that execute the programs using a computer readable recording medium. Examples of the computer readable recording medium include magnetic storage media (such as, ROM, floppy disks, hard disks, and the like), optical recording media (such as, CD-ROMs, DVDs, and the like), and storage media such as carrier waves (such as, transmission through the Internet).

According to the image printing method and apparatus of exemplary embodiments of the present invention, a barcode written on a printing medium can be read by a sensor unit for detecting the edge of the printing medium. Accordingly, since the edge of the printing medium can be detected while reading the barcode using one sensor unit, additional cost is not required in manufacturing the image printing apparatus. Also, by detecting the edge of the printing medium 10 and reading the barcode using one sensor unit, the printing process for printing the image can be more rapidly performed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for printing an image on a printing medium on which a barcode is written, comprising:
   a sensor unit for sensing the barcode and generating a sensing signal;
   a first counting unit for counting the sensing signal to generate a first count value when the value of the sensing signal is changed from a high value to a low value;
   a second counting unit for counting the sensing signal of the barcode simultaneously with the first counting unit to generate a second count value which is initialized whenever the value of the sensing signal is changed;
   a detecting unit for detecting the edge of the printing medium based on the first and second count values of the first counting unit and the second counting unit; and
   a reading unit for reading the barcode based on the second count value of the second counting unit.

2. The apparatus according to claim 1, wherein the detecting unit comprises:
   a comparing unit for comparing a conveyance distance of the printing medium calculated based on the first count value of the first counting unit with the total length of the barcode;
   a changing unit for changing an information flag value if the conveyance distance of the printing medium calculated based on the first count value of the first counting unit becomes greater than the total length of the barcode; and
   an edge detecting unit for detecting the edge of the printing medium based on the low value of the sensing signal generated after the information flag value is changed.

3. The apparatus according to claim 2, further comprising a printing medium determining unit for determining the printing medium as a printing medium on which a barcode is not written, if a conveyance distance of the printing medium calculated based on the second count value generated by the second counting unit is greater than the maximum width of a bar of the barcode,
   wherein the detecting unit detects the edge of the printing medium based on the counting time of the second counting unit, if the conveyance distance of the printing medium calculated based on the second count value generated by the second counting unit is greater than the maximum width of the bar of the barcode.

4. The apparatus according to claim 3, further comprising a calculating unit for calculating a feed length of the printing medium, depending on whether the barcode exists on the printing medium according to the determining result of the printing medium determining unit.

5. The apparatus according to claim 4, wherein the feed length is calculated according to the distance between the sensor unit and a feed roller for feeding the printing medium if a barcode is written on the printing medium, and is calculated according to the value obtained by subtracting the maximum width of the bar from the distance between the sensor unit and the feed roller for feeding the printing medium if a barcode is not written on the printing medium.

6. The apparatus according to claim 4, further comprising a controlling unit for controlling an image printing mode, based on the detected edge of the printing medium, printing medium information obtained from the read barcode, and the feed length.

7. A method for printing an image on a printing medium on which a barcode may be written, comprising:
   (a) sensing the printing medium and generating a sensing signal;
   (b) counting the sensing signal to generate a first count value when the value of the sensing signal is changed from a high value to a low value;
   (c) counting the sensing signal substantially simultaneously with operation (b) to generate a second count value which is initialized whenever the value of the sensing signal is changed;
   (d) reading the barcode based on the second count value; and
   (e) detecting the edge of the printing medium based on the first count value and the second count value.

8. The method according to claim 7, wherein operation (e) further comprises:

comparing a conveyance distance of the printing medium calculated based on the first count value with the total length of the barcode;

changing an information flag value if the conveyance distance of the printing medium calculated based on the first count value is greater than the total length of the barcode; and detecting the edge of the printing medium based on the low value of the sensing signal generated after the information flag value is changed.

9. The method according to claim 8, further comprising determining the printing medium as a printing medium on which a barcode is not written, if a conveyance distance of the printing medium calculated based on the second count value is greater than the maximum width of a bar of the barcode, wherein operation (e) detects the edge of the printing medium based on the counting time of operation (c), if the conveyance distance of the printing medium calculated based on the second count value is greater than the maximum width of a bar of the barcode.

10. The method according to claim 9, further comprising calculating a feed length of the printing medium, based on whether a barcode exists on the printing medium.

11. The method according to claim 10, wherein the feed length is calculated according to the distance between a sensor unit and a feed roller for feeding the printing medium if a barcode is written on the printing medium, and is calculated according to the value obtained by subtracting the maximum width of the bar from the distance between the sensor unit and the feed roller for feeding the printing medium if a barcode is not written on the printing medium.

12. The method according to claim 10, further comprising controlling an image printing mode based on the detected edge of the printing medium, printing medium information obtained from the read barcode, and the feed length.

13. A computer-readable medium of instructions for controlling a printing apparatus to read a barcode of a print medium and detect an edge of the print medium, comprising:

a first set of instructions adapted to control the print apparatus to sense the printing medium and generate a sensing signal;

a second set of instructions adapted to control the printing apparatus to count the sensing signal to generate a first count value when the value of the sensing signal is changed from a high value to a low value;

a third set of instructions adapted to control the printing apparatus to count the sensing signal substantially simultaneously with the second set of instructions, and to generate a second count value which is initialized whenever the value of the sensing signal is changed;

a fourth set of instructions adapted to control the printing apparatus to read the barcode based on the second count value; and a fifth set of instructions adapted to control the printing apparatus to detect the edge of the printing medium based on the first count value and the second count value.

14. The computer readable medium of instructions of claim 13, wherein the fifth set of instructions is further adapted to control the printing apparatus to compare the conveyance distance of the printing medium calculated based on the first count value with the total length of the barcode;

to change an information flag value if the conveyance distance of the printing medium calculated based on the first count value is greater than the total length of the barcode; and to detect the edge of the printing medium based on the low value of the sensing signal generated after the information flag value is changed.

15. The computer readable medium of instructions of claim 14, wherein the fifth set of instructions is adapted to control the printing apparatus to determine the printing medium as a printing medium on which a barcode is not written, if a conveyance distance of the printing medium calculated based on the second count value is greater than the maximum width of a bar of the barcode; and wherein the fifth set of instructions is adapted to control the printing apparatus to detect the edge of the printing medium based on the counting time of the third set of instructions if the conveyance distance of the printing medium calculated based on the second count value is greater than the maximum width of a bar of the barcode.

16. The computer readable medium of instructions of claim 15, further comprising a sixth set of instructions adapted to control the printing apparatus to calculate a feed length of the printing medium, based on whether a barcode exists on the printing medium.

17. The computer readable medium of claim 16, wherein the sixth set of instructions is further adapted to control the printing apparatus to calculate the feed length according to the distance between a sensor unit and a feed roller for feeding the printing medium if a barcode is written on the printing medium, and to calculate the feed length according to the value obtained by subtracting the maximum width of the bar from the distance between the sensor unit and the feed roller for feeding the printing medium if a barcode is not written on the printing medium.

18. The computer readable medium of claim 16, further comprising a seventh set of instructions adapted to control the printing apparatus to control an image printing mode based on the detected edge of the printing medium, printing medium information obtained from the read barcode, and the feed length.

* * * * *